US 8,184,763 B2

(12) United States Patent
Lecomte et al.

(10) Patent No.: US 8,184,763 B2
(45) Date of Patent: May 22, 2012

(54) SYSTEM AND A PROCESS FOR PRODUCING AT LEAST ONE HYDROCARBON FUEL FROM A CARBONACEOUS MATERIAL

(75) Inventors: Michel Lecomte, Rueil Malmaison (FR); Iraj Rahmim, Houston, TX (US); Alan Rossiter, Bellaire, TX (US)

(73) Assignee: Areva SA, Paris (FR)

( * ) Notice: Subject to any disclaimer, the term of this patent is extended or adjusted under 35 U.S.C. 154(b) by 567 days.

(21) Appl. No.: 12/319,861

(22) Filed: Jan. 13, 2009

(65) Prior Publication Data
US 2010/0177861 A1 Jul. 15, 2010

(51) Int. Cl.
*G21G 1/02* (2006.01)
(52) U.S. Cl. ......... 376/323; 376/324; 376/325; 376/148
(58) Field of Classification Search .......... 376/323–325, 376/148; 202/173; 60/39.01, 39.02
See application file for complete search history.

(56) References Cited

U.S. PATENT DOCUMENTS

| | | | |
|---|---|---|---|
| 3,972,958 A * | 8/1976 | Garwood et al. ............. 208/414 |
| 6,011,073 A | 1/2000 | Agee et al. | |
| 6,306,917 B1 * | 10/2001 | Bohn et al. .................... 518/700 |
| 6,711,903 B1 * | 3/2004 | Rich, Jr. ......................... 60/781 |
| 6,862,330 B2 * | 3/2005 | Boardman et al. ............ 376/323 |
| 2006/0211777 A1 * | 9/2006 | Severinsky .................... 518/702 |
| 2007/0201304 A1 | 8/2007 | Joussot-Dubien et al. | |
| 2007/0212293 A1 | 9/2007 | Porter et al. | |
| 2007/0244208 A1 | 10/2007 | Shulenberger et al. | |
| 2008/0040975 A1 | 2/2008 | Calderon | |

(Continued)

FOREIGN PATENT DOCUMENTS
DE 203 20 020 U1 5/2004
(Continued)

OTHER PUBLICATIONS

Steinberg M et al: "Synthetic carbonaceous fuel and feedstock using nuclear power, air and water" International Journal of Hydrogen Energy, Elsevier Science Publishers B.V., Barking, GB, vol. 2, No. 2, Jan. 1, 1977, pp. 189-207, XP025567861 ISSN: 0360-3199 [retrieved on Jan. 1, 1977].

*Primary Examiner* — Ricardo Palabrica
(74) *Attorney, Agent, or Firm* — Davidson, Davidson & Kappel, LLC

(57) ABSTRACT

A system for producing at least one hydrocarbon fuel from a carbonaceous material, the system including:
a nuclear power plant;
a hydrocarbon fuel manufacturing plant, including at least an electrolyzer unit for producing a first hydrogen stream from water and electric power provided by the nuclear power plant, and an hydrocarbon fuel synthesis unit, the nuclear power plant supplying power to a power distribution grid to which electric power consumers other than the hydrocarbon manufacturing plant are electrically connected;
a buffer storage of at least one given hydrocarbon fuel;
a reforming unit for producing a second hydrogen stream from the at least one given hydrocarbon fuel, and a device to feed the at least one given hydrocarbon fuel to the reforming unit at a controlled feed flow rate;
a device to feed the hydrocarbon fuel synthesis unit with the first hydrogen stream at a first controlled flow rate and with the second hydrogen stream at a second controlled flow rate; and
a device to control the first and second controlled flow rate as a function of a current electrical power delivered by the nuclear power plant and the current power consumption of the electric power consumers.

13 Claims, 2 Drawing Sheets

U.S. PATENT DOCUMENTS

| | | |
|---|---|---|
| 2008/0115415 A1 | 5/2008 | Agrawal et al. |
| 2008/0135496 A1 | 6/2008 | Joussot-Dubien et al. |
| 2008/0279728 A1 | 11/2008 | Turc et al. |

FOREIGN PATENT DOCUMENTS

| | | |
|---|---|---|
| FR | 2814967 A1 | 4/2002 |
| FR | 2874513 A1 | 3/2006 |
| FR | 2891161 A1 | 3/2007 |
| FR | 2891162 A1 | 3/2007 |
| JP | 2008 163873 A | 7/2008 |
| WO | WO 2006/099573 A1 | 9/2006 |
| WO | WO 2007/036512 A1 | 4/2007 |
| WO | WO 2008/033812 A2 | 3/2008 |
| WO | WO 2008/115933 A1 | 9/2008 |

* cited by examiner

SYSTEM AND A PROCESS FOR PRODUCING AT LEAST ONE HYDROCARBON FUEL FROM A CARBONACEOUS MATERIAL

FIELD OF THE INVENTION

The invention relates generally to the field of hydrocarbon fuel production from a carbonaceous material, and more specifically to the field of combined production of electricity and hydrocarbon fuel using a nuclear power plant and a hydrocarbon fuel manufacturing plant.

BACKGROUND OF THE INVENTION

Nuclear power plants are usually connected to a power distribution grid, for distributing electric power to final customers. The investment cost for a nuclear power plant is very high. To maximize the return on investment, the power plant should operate at a load as close as possible to 100%, during very long periods. However, electric consumption of the final customers varies along the day, with peak consumption in the morning and in the evening, especially during wintertime. On the other hand, consumption is lower during the night. The electric consumption varies as well with the seasons, and may be higher during winter—heating season—and summer—cooling season—than during spring and autumn. In certain countries, such as France, as a result of their large production share nuclear power plants are operated such that their load follows the power consumption. It is therefore difficult to have the power plant operating continuously at a load close to 100%.

Furthermore, a strong and fast modification in power consumption is difficult to accommodate, both at the level of the grid and at the level of the nuclear power plant.

WO2006/099573 describes a hydrocarbon fuel manufacturing plant with a nuclear power plant dedicated to feeding electricity only to the fuel manufacturing plant.

WO2008/115933 describes a renewable power source, such as a wind power source, dedicated to a hydrocarbon fuel manufacturing plant.

US2008/0040975 describes a facility for producing, from a carbonaceous material, fuel, electricity (gas turbine) and urea.

WO2008/033812 describes a facility for producing a hydrocarbon fuel from carbonaceous material (biomass) and hydrogen. The hydrogen is produced using electricity from a non carbon emitting dedicated source, such as wind power, solar power or nuclear power.

U.S. Pat. No. 6,306,917 describes a facility that can selectively maximize the production of power (gas turbine), hydrocarbons and carbon dioxide.

SUMMARY OF THE INVENTION

There is a need for a system that helps keep a nuclear power plant close to 100% load, in spite of variations in electric consumption of the final consumers.

The Applicant has discovered that coupling the nuclear power plant both to the grid and to a hydrocarbon fuel manufacturing plant permits operation of the nuclear power plant at a near constant power, in spite of the variations of the power consumption of the final consumers connected to the grid, and that the hydrocarbon fuel manufacturing plant can be adapted to take into account changes in the power availability from the power plant, while maintaining a high throughput.

One object of the invention is to optimize the operation of a nuclear power plant, to keep the plant at a load close to 100% in spite of the variation of the total consumption of the final consumers.

Another alternate or additional object is to propose a system that permits producing both nuclear electrical power and hydrocarbon fuel, while permitting to operate the nuclear power plant and the hydrocarbon fuel manufacturing plant with a high level of efficiency.

Another alternate or additional object of the invention is to propose a system in which a major electric power consumer can decrease its electrical power consumption to the grid at will, when the grid regulator requires him to do so.

These and other objects of the present invention will become more apparent to those skilled in the art to which the invention pertains, from the following description and appended claims. Reference is now made to the accompanying drawings forming part of this specification. It is to be noted that the embodiments shown herein are for the purpose of description and not limitation.

DETAILED DESCRIPTION OF THE DRAWINGS

Figure 1:
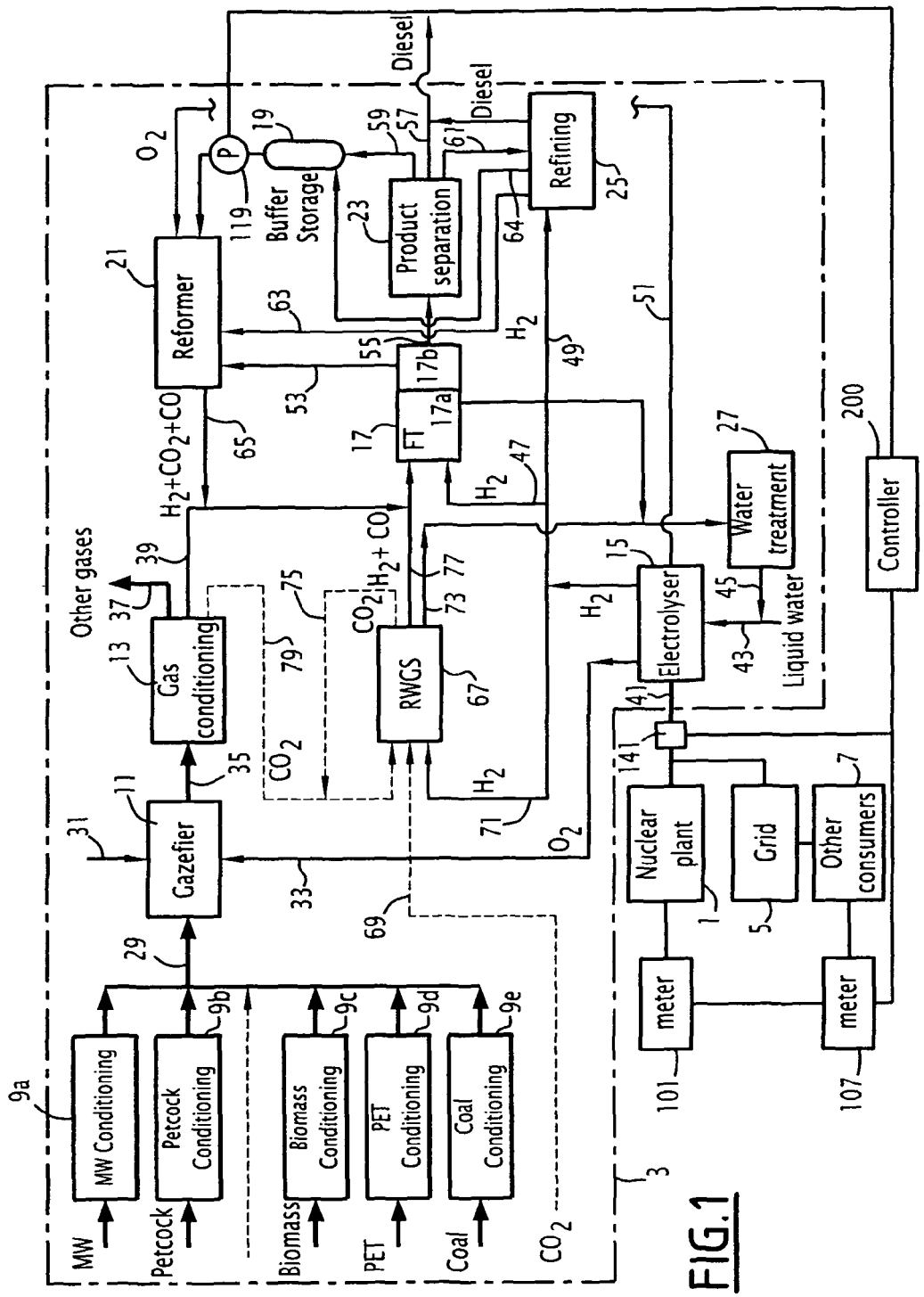
FIG. 1 is a process flow diagram in block form of a first embodiment of the invention.

The system on FIG. 1 has a nuclear power plant 1, an hydrocarbon fuel manufacturing plant 3, for manufacturing diesel fuel, and a power distribution grid 5 to which electric power consumers 7 other than said hydrocarbon manufacturing plant 3 are electrically connected.

The grid 5 is electrically connected to the nuclear power plant 1 and conveys the electric power from the nuclear power plant to the consumers 7. The power consumers have a variable total power consumption, the power demand of the consumers changing with the time. The total power consumption changes for example in the following way during the course of a day: maximum (100%) from 7:30 a.m. to 9:00 a.m., from 11:30 a.m. to 13:00 p.m., and from 19:00 p.m. to 20:30 p.m.; about 60% between 9 a.m. and 11:30 a.m. and between 13:00 p.m. and 19:00 p.m.; about 20% between 20:30 p.m. and 7:30 a.m.

The hydrocarbon fuel manufacturing plant 3 comprises:
at least one carbonaceous material conditioning unit 9a, 9b, 9c, 9d, 9e;
a gasifier 11, for example a super-critical partial oxidation gasifier;
a gas conditioning unit 13;
an electrolyzer unit 15,
an hydrocarbon fuel synthesis unit 17;
a buffer storage 19;
a reforming unit 21;
a product separation unit 23;
a refining unit 25;
a water treatment unit 27.

The carbonaceous material is one or several of municipal waste, petcoke biomass, polyethylene terephtalate, coal, or other organic material. The plant 3 has to have a conditioning unit 9 dedicated to each type of material, and depending on the type of material, the conditioning unit for example mix the carbonaceous material with water to create a slurry.

After conditioning, a stream of conditioned carbonaceous material is fed to the gasifier 11 via line 29.

The supercritical partial oxidation gasifier 11 may be of the type described in French patent applications FR 0012929, FR 0451902, FR 0552924, and/or FR 0552926, or the related U.S. Patent Publication Nos. US2008 135496, US2007 201304, US2008 279728 and PCT publication WO2007/036512, which are all incorporated herein by reference. Gasifier 11 receives a stream of supercritical water via line 31 and a stream of oxygen coming from the electrolyzer unit via line 33 In the gasifier, the carbonaceous material are partially oxidized to form an oxidized carbonaceous material stream comprising mainly CO, CO2 and H2, plus miscellaneous other gases, such as H2S, argon, N2, C1-C3, butadiene, benzene, toluene and others.

The oxidized carbonaceous material stream is fed to the gas conditioning unit 13 via line 35. In the gas conditioning unit, CO2 and the miscellaneous other gases are separated from CO and H2. CO2 and the miscellaneous other gases leave the gas conditioning unit via line 37 and can be subjected to other treatment steps which are out of the scope of the present invention. Said other treatment steps may be pressure swing adsorption for N2 removal, amine or Selexol treatment for H2S removal, or zinc oxide beds for trace H2S removal. H2 and CO form a syngas stream, and are fed via line 39 to the hydrocarbon fuel synthesis unit 17. The gas conditioning unit is of a type known to those skilled in the art and will not be described in detail here.

The electrolyzer unit 15 produces hydrogen and oxygen, from water and from electric power provided by the nuclear power plan 1 via line 41. Water comes from outside of the plant via line 43 and/or from the water treatment unit via line 45. A first hydrogen stream is provided from the electrolyzer unit to the hydrocarbon fuel synthesis unit 17 via line 47. Hydrogen is also sent to the refining unit 25 via line 49. Oxygen streams are fed to gasifier 11, and to the reforming unit 21 via line 51.

The hydrocarbon fuel synthesis unit 17 comprises one or several reactors 17a and produces a product stream containing a wide range of hydrocarbon compounds. The reactors are fed with the syngas stream from the gas conditioning unit 13, with the first hydrogen stream from the electrolyzer unit 15, and with a second hydrogen stream from the reforming unit 21 (see below). The reactors are for example Fischer-Tropsch reactors, containing adapted catalysts. Such reactors are described for example in PCT Publication No. WO2008/115933, which is hereby incorporated by reference herein. In the reactors, CO and H2 are reacted together to form hydrocarbon compounds. At the exit of the reactors, the product stream contains CO2, unreacted CO and H2, and a wide range of hydrocarbon compounds.

The hydrocarbon fuel synthesis unit 17 comprises a preliminary separation unit 17b, fed with the product stream coming from the reactors. In the preliminary separation unit, CO2, CO, H2 and light hydrocarbon compounds are separated from heavier hydrocarbon compounds. Light hydrocarbon compunds comprise mainly hydrocarbon compound with fewer than 4 carbons. CO2, CO, H2 and light hydrocarbons are sent to the reforming unit 21 via line 53 or, alternatively, to a short-term buffer storage (not shown in figures) prior to sending to the reforming unit 21. Heavier hydrocarbon compounds are sent to product separation unit 23 via line 55.

In product separation unit 23, the heavier compound stream is separated into a diesel fuel stream, in a heavy hydrocarbon stream and in a naphta stream. Diesel fuel is the final product and exits the plant via line 57. Naphta is fed to the buffer storage 19 via line 59. The heavy hydrocarbon stream comprises for example mostly C16+ compounds and is fed to the refining unit 25 via line 61. For example, the diesel fuel stream can include most of the C10 to C15 hydrocarbons of the product stream, the naptha stream most of the C4 to C9 hydrocarbons of the product stream and the heavy hydrocarbon stream the rest.

In the refining unit 25, the heavy hydrocarbon stream is reacted with hydrogen to produce mostly diesel fuel, naphta and a light hydrocarbon stream. The light hydrocarbon stream comprises mainly hydrocarbon compound with fewer than 4 carbons and is sent to the refining unit 21 via line 63. Naphta is sent to the buffer storage 19 via line 64.

The hydrocarbon fuel manufacturing plant 3 comprises means to feed naphta from the buffer storage 19 to the reforming unit 21 at a controlled feed flow rate. Such means can be for example a pump 119, controlled by a controller 200. Controller 200 may include, for example, a microprocessor or circuitry such as a ASIC.

The reforming unit 21 is fed with the CO2, CO, H2 and light hydrocarbon stream from unit 17 or intermediate short-term buffer storage, with the light hydrocarbon stream from the refining unit 25, with O2 from the electrolyzer unit 15, and with a controlled flow of naphta from buffer storage 19. The reforming unit 21 is for example a combined partial oxidation/steam reforming unit, of a type known to those skilled in the art for reforming low C hydrocarbon and napthas. Reforming unit 21 produces a stream containing H2, CO and CO2. This stream defines the so called second hydrogen stream mentioned above with respect to the inputs to the hydrocarbon fuel synthesis unit 17. The second hydrogen stream is fed to the hydrocarbon fuel synthesis unit 17 via line 65. The reforming unit 21 may be a steam reformer of the type described in US patent publication n° US2007212293, which is incorporated herein by reference.

The ratio H2/CO in the feed of the synthesis unit 17, calculated taking into account the various streams fed to the hydrocarbon fuel synthesis unit 17 via lines 39, 47 and 65, should be slightly above 2.

The system has means to feed the hydrocarbon fuel synthesis unit 17 with the first hydrogen stream at a first controlled flow rate and with the second hydrogen stream at a second controlled flow rate. The means to control the first hydrogen stream at a first controlled rate can include for example a power control unit 141 for the electrolyzer 15, and the means to control the second hydrogen stream at a second controlled rate can include for example the pump 119.

The systems also has means to control the first and second controlled flow rate as a function of a current electrical power delivered by the nuclear power plant 1 and the current power consumption of the electric power consumers 7. This control means for the first and second controlled flow rate may include a controller, for example the same controller 200, which may for example include include a microprocessor or circuitry such as an ASIC. A meter or meters 107 for assessing the current power consumption of the electric power consumers 7, and a meter or meters 101 for assessing the current electrical power of the nuclear power plant 1. Said means can be included in the general regulation system of the electric power distribution grid.

The means to control the first controlled flow rate thus include means to control the electric power provided by the nuclear power plant 1 to the electrolyzer unit 15. The actual power control can carried out for example manually from the control room of the electrolyzer unit 15 to alter the power control unit 141 or automatically by the controller 200, for example as a function of the data from the power meters.

The means to control the second controlled flow rate thus can include the means to control the feed flow rate at which the naphta is fed to the reforming unit 21 from the buffer tank 19, described above. The feed control can carried out for example manually from the control room of the hydrocarbon fuel synthesis unit 17 to alter the pump or automatically by controller 200, for example as a function of the data from from the power meters.

The system is operated as follows.

When the total electric consumption of the final consumers 7 is low, the electrolyzer unit 15 is operated at a power close to its maximum power, and no naphta is fed from the buffer storage 19 to the reforming unit 21. Naphta is accumulated in the buffer storage 19, for use later when the electric consumption is higher.

When sufficient electric power is available for the production of Diesel fuel, the electrolyzer unit is typically operated between 80% and 100% of its maximum power. The second feed rate is maintained at zero.

At the periods of peak consumptions by the final customers 7 of the grid, the authority in charge of managing power distribution through the grid can ask the electrolyzer unit 15 to reduce the power received from the nuclear power plant, to avoid shortage at the final customers level. The authority can require the power level to be reduced down to a reduced power level being in a range comprised between 25% and 100% of the maximum power of the electrolyzer unit. Preferably, the reduced power level is between 50% and 100% of the maximum power level. The flow rate of the first hydrogen stream fed to the hydrocarbon fuel synthesis unit 17 is automatically decreased in the same proportion. To compensate and keep the ratio H2/CO above 2 in the feed of the synthesis unit 17, the flow rate of the second hydrogen stream is increased. For that purpose, naphta is fed from the buffer storage 19 to the reforming unit 21 and converted to CO and H2.

The changes of the respective flow rates of the first and second hydrogen streams can be carried out quickly, and follow closely the power consumption variations described above. In any case, the nuclear power plant will be operated continuously with a load close to 100%. Said 100% load must be understood as being the maximum available load of the nuclear power plant. The available load may be different from the design load, especially when maintenance operations are under way in the nuclear power plant.

The electrolyzer unit requires a high electrical power. For example, the maximum power is between 1000 and 1700 MW for a hydrocarbon fuel manufacturing plant having a capacity of approx 20 000 barrels to 40 000 barrels/day depending on the feedstock. Reducing the power down to 25% of the maximum power releases between 750 and 1275 MW for other customers and is a major practical advantage for the management of the power distribution grid. With CO2 as carbonaceous material and an electrolyzer unit having an electrical power of 1250 MW, the hydrocarbon fuel manufacturing plant can produce about 10 000 barrels/day of hydrocarbon fuel.

As illustrated on FIG. 1, the carbonaceous material is not necessarily a solid material but can be gaseous carbon dioxide. CO2 can be used instead a solid carbonaceous material source, or in addition to said source. CO2 can be extracted from the atmosphere or from industrial plant offgases, for example from coal fired power plants. In this case, the hydrocarbon fuel manufacturing plant 3 includes a RWGS unit 67 (Reverse Water Gas Shift), shown in dotted lines on FIG. 1. CO2 is fed to the RWGS unit via line 69, along with hydrogen fed from the electrolyzer unit 15 via line 71. In the RWGS unit, CO2 is reacted with H2 according to the following equation:

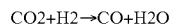

The resulting water is separated and fed to the water treatment unit via line 73. The unreacted CO2 can be separated and recycled via line 75. The unreacted H2 and the newly formed CO is fed to the hydrocarbon fuel synthesis unit 17 via line 77.

If a solid source of carbonaceous material is used in addition to CO2, the oxidized carbonaceous material stream is separated in the gas conditioning unit 13 in three different streams: a CO2 stream fed to the RWGS via line 79, a miscellaneous other gases stream leaving the gas conditioning unit via line 37, and a syngas stream fed to the hydrocarbon fuel synthesis unit via line 39.

Figure 2:
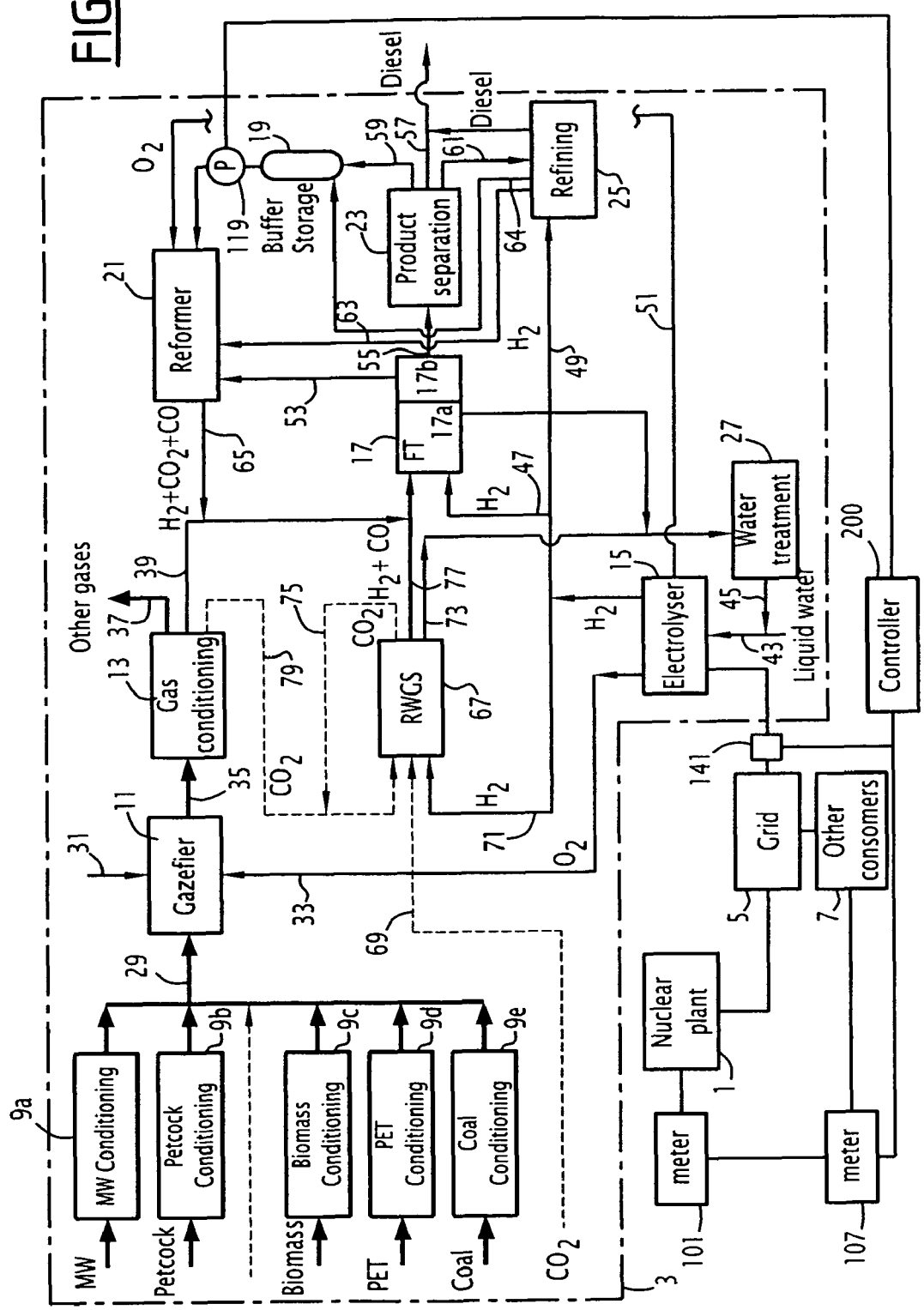
FIG. 2 is a process flow diagram in block form of a second embodiment of the invention.

FIG. 2 shows a second embodiment of the present invention. Only the features which are different in the first and second embodiments will be described here below. The elements which are identical or which have the same functions will bear the same references in both embodiments.

In the first embodiment, the electrolyzer unit 15 is fed electrically by the nuclear power plant 1 via a dedicated power line 41 which is not part of the grid 5. In the second embodiment, the electrolyzer unit 15 is fed electrically by the nuclear power plant 1 via the grid 5. In the first embodiment, the electrolyzer unit 15, and generally the hydrocarbon fuel manufacturing plant 3, are necessarily not too far away from the nuclear power plant, for example in the range of 5 kilometers on less. In the second embodiment, it is possible to take advantage of the grid to build the electrolyzer unit 15 and generally the hydrocarbon fuel manufacturing plant 3 farther away from the nuclear power plant 1.

The invention has been described with reference to FIGS. 1 and 2 as including a plant for manufacturing diesel fuel. However, the plant could manufacture any other suitable hydrocarbon fuel, such as kerosene.

The hydrocarbon fuel stored in the buffer tank and recycled into the reforming unit has been described as being naphta. It is advantageous to recycle naphta, considering that it has a lower market value than diesel. However, it is possible to store and recycle another hydrocarbon fuel, the final choice being made as a function of the market value of the different fuels produced by the plant.

Fischer-Tropsch reactors could be replaced by other types of suitable synthesis reactors, for example methanol-to-gasoline reactors.

In the description above, reference is made to the electrical power produced or consumed by various units or plants. Said electrical power must be understood as a peak power (crest power). It includes wherever applicable both active and reactive powers.

In the description above, a nuclear power plant is understood as a plant than can include one on several nuclear reactor units. Each nuclear reactor unit usually has an electric power between 1000 MWe and 1700 MWe, depending on the reactor technology.

What is claimed is:

1. A system for producing at least one hydrocarbon fuel from a carbonaceous material, the system comprising:
    a nuclear power plant;
    an hydrocarbon fuel manufacturing plant, for manufacturing said at least one hydrocarbon fuel, comprising at least an electrolyzer unit for producing a first hydrogen stream from water and electric power provided by the nuclear power plant, and an hydrocarbon fuel synthesis unit for producing a product stream containing the at least one hydrocarbon fuel from at least said carbonaceous material and hydrogen, the nuclear power plant supplying power to a power distribution grid to which electric power consumers other than said hydrocarbon manufacturing plant are electrically connected, the grid being electrically connected to the nuclear power plant and said other electric power consumers having a total variable power consumption;

a buffer storage of at least one given hydrocarbon fuel;

a reforming unit for converting said at least one given hydrocarbon fuel to a second hydrogen stream containing at least hydrogen, and means to feed said at least one given hydrocarbon fuel to said reforming unit at a controlled feed flow rate;

means to feed the hydrocarbon fuel synthesis unit with the first hydrogen stream at a first controlled flow rate and with the second hydrogen stream at a second controlled flow rate; and means to control the first and second controlled flow rate as a function of a current electrical power delivered by the nuclear power plant and the current power consumption of the electric power consumers, programmed to increase the second controlled flow rate when the first controlled flow rate is decreased because the electric power received by the electrolyzer unit is reduced.

2. The system of claim 1, wherein the means to control the first controlled flow rate includes a controller to control the electric power provided by the nuclear power plant to the electrolyzer unit.

3. The system of claim 2, wherein the electrolyzer unit has a given maximum electric power, the controller being able to control the electric power provided by the nuclear power plant to the electrolyzer unit between 25% and 100% of said maximum electric power.

4. The system of claim 1, wherein the means to control the second controlled flow rate includes a controller to control the feed flow rate at which said at least one given hydrocarbon fuel is fed to the reforming unit.

5. The system of claim 1, wherein the hydrocarbon fuel synthesis unit is able to produce a product stream containing at least first and second hydrocarbon fuels from at least said carbonaceous material and hydrogen, the second hydrocarbon fuel being said given hydrocarbon fuel, the hydrocarbon fuel manufacturing plant including a product separation unit for separating the second hydrocarbon fuel from the product stream and a transfer device to transfer the second hydrocarbon fuel to the buffer storage.

6. The system of claim 5, wherein the first hydrocarbon fuel is diesel fuel and the second hydrocarbon fuel is naphta.

7. The system of claim 1, wherein said given hydrocarbon fuel is naphta.

8. The system of claim 1, wherein the hydrocarbon fuel synthesis unit is able to produce a product stream containing at least light hydrocarbons and the at least one hydrocarbon fuel from at least said carbonaceous material and hydrogen, the hydrocarbon fuel manufacturing plant including a preliminary product separation unit for separating the light hydrocarbons from the product stream, and a transfer device to transfer the light ends to the reforming unit.

9. The system of claim 1, wherein the electrolyzer unit of the hydrocarbon fuel manufacturing plant is electrically connected to the nuclear power plant via the electric power distribution grid.

10. The system of claim 1, wherein the carbonaceous material is at least one of municipal waste, petcoke, biomass, polyethylene terephtalate, coal and carbon dioxide.

11. The system of claim 1, wherein the hydrocarbon fuel manufacturing plant includes a partial oxidation gasifier for producing a syngas stream at least from said carbonaceous material, the hydrocarbon fuel synthesis unit including a synthesis reactor for producing said product stream from said syngas stream and hydrogen.

12. A system for producing at least one hydrocarbon fuel from a carbonaceous material, the system comprising:

a nuclear power plant;

an hydrocarbon fuel manufacturing plant, for manufacturing said at least one hydrocarbon fuel, comprising at least an electrolyzer unit for producing a first hydrogen stream from water and electric power provided by the nuclear power plant, and an hydrocarbon fuel synthesis unit for producing a product stream containing the at least one hydrocarbon fuel from at least said carbonaceous material and hydrogen, the nuclear power plant supplying power to a power distribution grid to which electric power consumers other than said hydrocarbon manufacturing plant are electrically connected, the grid being electrically connected to the nuclear power plant and said other electric power consumers having a total variable power consumption;

a buffer storage of at least one given hydrocarbon fuel;

a reforming unit for converting said at least one given hydrocarbon fuel to a second hydrogen stream containing at least hydrogen, and a feed unit for feeding said at least one given hydrocarbon fuel to said reforming unit at a controlled feed flow rate;

the hydrocarbon fuel synthesis unit receiving the first hydrogen stream at a first controlled flow rate and the second hydrogen stream at a second controlled flow rate; and a controller controlling the first and second controlled flow rate as a function of a current electrical power delivered by the nuclear power plant and the current power consumption of the electric power consumers, programmed to increase the second controlled flow rate when the first controlled flow rate is decreased because the electric power received by the electrolyzer unit is reduced.

13. The system of claim 12, wherein the controller is programmed to control the first and second flow rates to accumulate said given hydrocarbon fuel in the buffer storage when the electrolyzer unit is operating between 80% and 100% of its maximum power.

* * * * *